United States Patent [19]

Pirani

[11] 4,358,844
[45] Nov. 9, 1982

[54] METHOD OF AND MEANS FOR SPREAD-SPECTRUM TRANSMISSION

[75] Inventor: Giancarlo Pirani, Turin, Italy

[73] Assignee: Cselt, Centro Studi E Laboratori Telecomunicazioni S.p.A., Turin, Italy

[21] Appl. No.: 215,794

[22] Filed: Dec. 12, 1980

[30] Foreign Application Priority Data

Dec. 13, 1979 [IT] Italy ............................... 69389 A/79

[51] Int. Cl.³ .............................................. H04J 13/00
[52] U.S. Cl. ......................................... 370/18; 370/19
[58] Field of Search ................ 370/18, 19, 119; 375/1

[56] References Cited

U.S. PATENT DOCUMENTS 4,001,564  1/1977  Bied-Charreton et al. ........... 370/19
4,312,073  1/1982  De Niet et al. ......................... 370/18

OTHER PUBLICATIONS

"Spread Spectrum as a Multiplexing Technique", Proceedings of the IREE, vol. 34, No. 4, May 1973.

Primary Examiner—Gerald L. Brigance
Attorney, Agent, or Firm—Karl F. Ross

[57] ABSTRACT

An analog signal sent from one telephone subscriber to another is differentiated at a transmitting terminal and the resulting derivative is distorted by mixing with a random or pseudorandom sequence of bipolar binary pulses before being conveyed, e.g. by frequency modulation, to a receiving terminal where it is mixed with a like pulse sequence to re-establish the undistorted derivative signal with substantial suppression of interferences from other users of the same signal link. The re-established signal is integrated over intervals equal to a basic pulse period of the binary sequence and each signal sample thus obtained is additively combined with the sample from the immediately preceding period to restore the original analog signal. The signal link utilized may be an emergency channel made available, e.g. for communication with a mobile station, when regular channels are busy.

7 Claims, 4 Drawing Figures

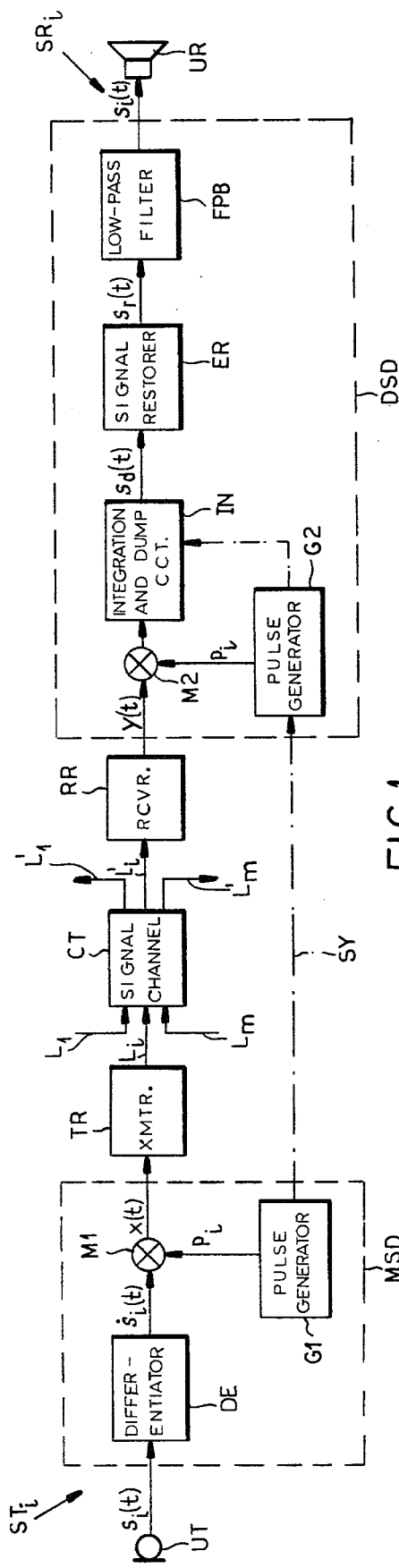
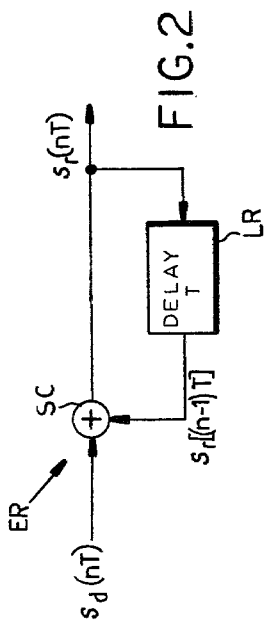
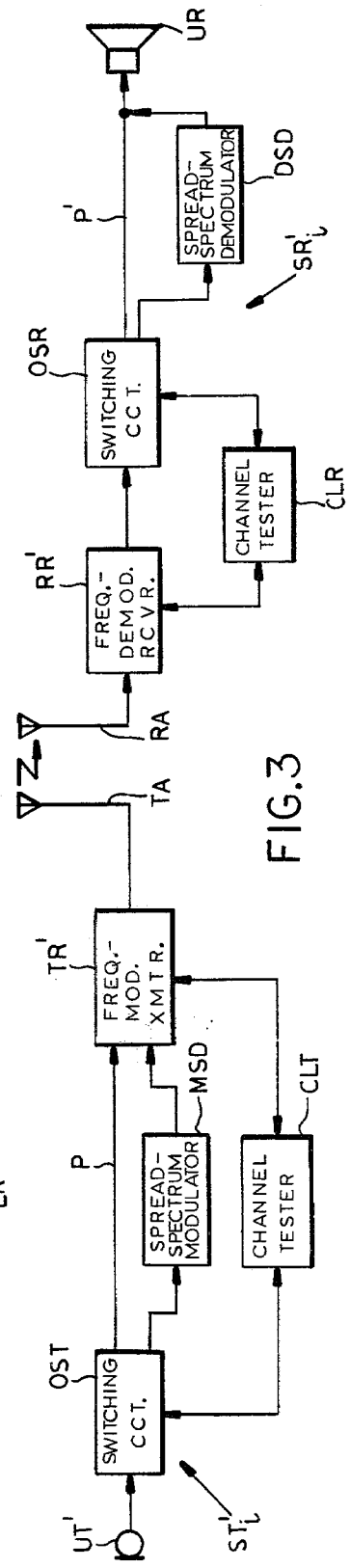
FIG.1
FIG.2
FIG.3

METHOD OF AND MEANS FOR SPREAD-SPECTRUM TRANSMISSION

FIELD OF THE INVENTION

My present invention relates to a method of and means for sending signals from a plurality of transmitting stations to respective receiving stations over a common channel, e.g. a radio link, forming part of a so-called spread-spectrum telecommunication system.

BACKGROUND OF THE INVENTION

Spread-spectrum modulation has long been used in the transmission of digital signals from different sources over a common channel, its purpose being to insure the privacy of the transmitted messages and to minimize mutual interference among simultaneously transmitted signals. At a transmitting station, outgoing digital signals (which could be analog signals converted into binary form) are multiplied with a random or pseudorandom sequence of binary pulses whose period is a submultiple of the symbol duration; the sequences generated at the transmitting stations are essentially uncorrelated among one another. Such sequences may conform, for example, to the well-known Walsh function. At an associated receiving station, the incoming digital signal distorted by the aforementioned pulse sequence—and possibly encumbered by interfering signals from other users of the same channel—is multiplied with a pulse sequence which is a precise replica of the one used at the transmitting end and is properly synchronized therewith. This procedure re-establishes the original binary signal which is then integrated over limited intervals, equaling the duration of the symbols, to eliminate accompanying interferences. The digital signal thus purged can be reconverted, if desired, into analog form.

Since digital signals require a considerable bandwidth for their transmission, spread-spectrum modulation has heretofore been generally limited to military uses. Moreover, the analog/digital conversion at the transmitting end and the digital/analog reconversion at the receiving end are cumbersome procedures which limit the utility of such systems for civilian purposes, e.g. for intercommunication among telephone subscribers.

OBJECTS OF THE INVENTION

The general object of my present invention is to provide a method of and means for enabling the transmission of analog signals by the spread-spectrum technique without the need for intervening conversions into and from digital form.

A more particular object is to adapt the spread-spectrum technique for use with mobile stations carried, for example, aboard automotive vehicles.

SUMMARY OF THE INVENTION

I have found that the direct transmission of analog signals by the aforedescribed technique is possible if the outgoing signal is preprocessed before being multiplied with the binary pulse sequence individual to the station considered and if the incoming signal at the associated receiving station is subjected to an aftertreatment reconstituting the original analog signal by eliminating high-frequency components due to the preceding short-term integration, all with maintenance of the essentially analog character of the transmitted signal.

In accordance with my present invention, the preprocessing involves a differentiation of the outgoing analog signal to produce a time derivative thereof which is then multiplied at the transmitting and receiving ends with identical and synchronized random or pseudorandom binary pulse sequence of bipolar character so that the first multiplication inverts the polarity of the analog signal at irregular intervals while the second multiplication restores that polarity; the two identical binary sequences have a basic pulse period which does not exceed the reciprocal of twice the bandwidth of the outgoing signal and preferably ranges between about one-third and one-fourth of that reciprocal. At the associated receiving station, the integration (following the second multiplication) is performed over intervals equaling the basic pulse period of these binary sequences whereby signal samples of uniform width are obtained. These signal samples are then combined into a continuous wave, substantially purged of interfering signals, which has a low-frequency component conforming to the outgoing analog signal. That component can readily be isolated by low-pass filtering.

According to a more particular feature of my invention, the step of combining the signal samples from the integration procedure into a continuous wave comprises adding each new signal sample to a delayed sum sample obtained by the addition of an immediately preceding sample to a sum sample produced in like manner one basic pulse period earlier.

Thus, a system for the transmission of analog signals in accordance with my present invention comprises first and second arithmetic means at a transmitting station and at an associated receiving station connected to respective generators of synchronized binary pulse sequences for performing the two multiplication steps set forth above, together with circuitry including integrating means connected to the second arithmetic means for substantially reconstituting the outgoing signal. Pursuant to my present improvement, I further provide differentiation means upstream of the first arithmetic means for converting an outgoing analog signal into its time derivative giving rise to a distorted signal in the output of the first arithmetic means, this distorted signal being reconverted by the second arithmetic means into the original time derivative which may be encumbered by interfering signals to be suppressed upon subsequent integration. The aforementioned circuitry also includes signal-restoring means connected to the integrating means for receiving therefrom integrated samples and combining same into a continuous wave as discussed above, followed by filter means for extracting the low-frequency component of that wave conforming to the original signal.

BRIEF DESCRIPTION OF THE DRAWING

The above and other features of my invention will now be described in detail with reference to the accompanying drawing in which:

FIG. 1 is a block diagram of part of a telecommunication system embodying my invention;

FIG. 2 is a more detailed diagram of a signal restorer in a receiving station of the system of FIG. 1;

FIG. 3 is a block diagram similar to that of FIG. 1, showing an adaptation of the system for use with a mobile station.

SPECIFIC DESCRIPTION

Figure 4:
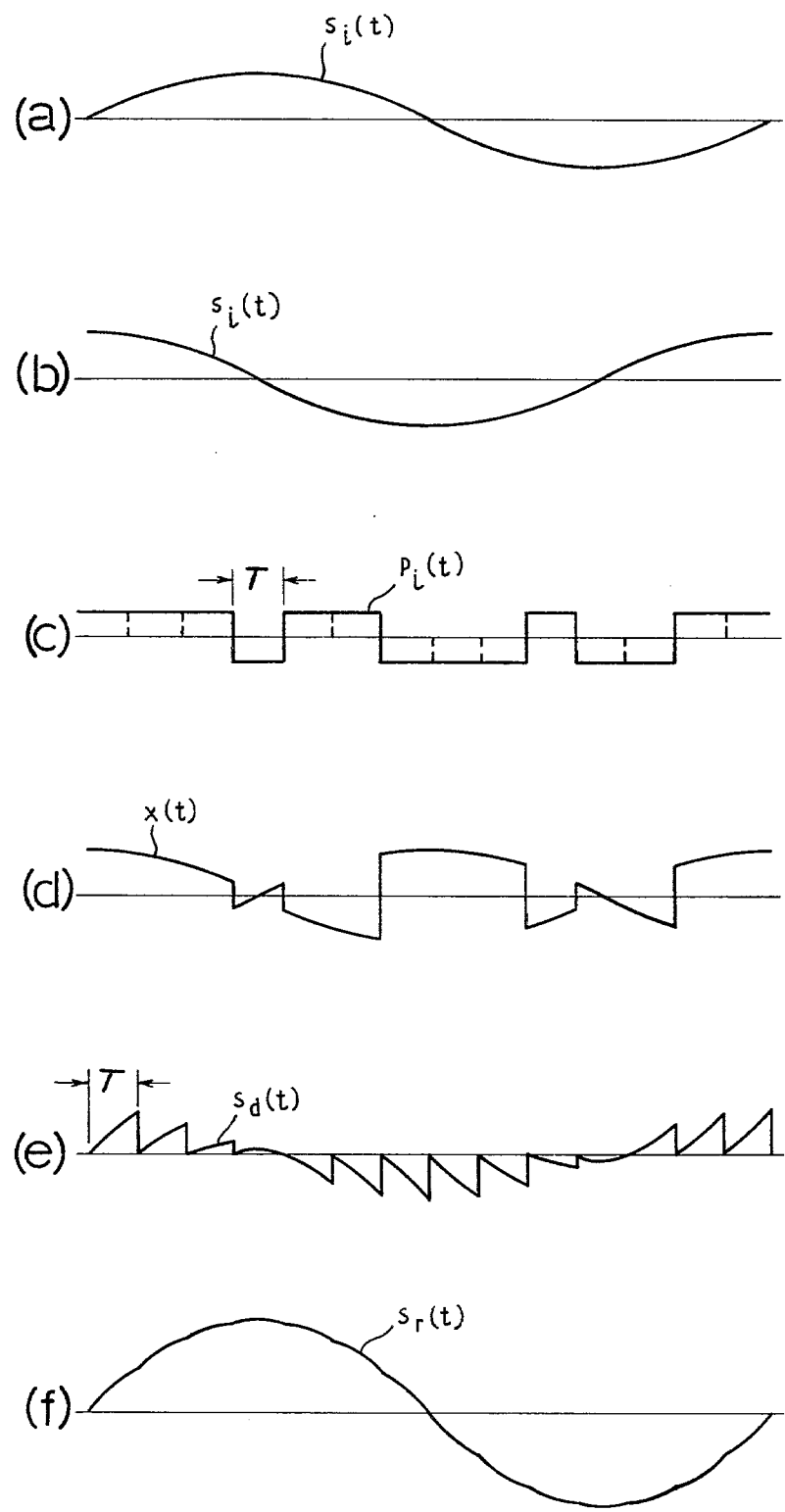
FIG. 4 is a set of graphs relating to the operation of the system of FIG. 1.

In FIG. 1 I have shown a transmitting station $ST_i$ communicating with a receiving station $SR_i$ via a common signal channel CT which could be a cable or a radio link. Station $ST_i$ is representative of a group of transmitting stations connected to the input end of channel CT via respective lines $L_1—L_m$; similar lines $L'_1—L'_m$ extend from the output end of that channel to a group of receiving stations of which station $SR_i$ is representative.

Transmitting station $ST_i$ serves a subscriber's telephone set UT symbolized by a microphone. A subscriber set served by receiving station $SR_i$ is symbolized by a speaker UR. The equipment shown in FIG. 1 and described hereinafter is designed only for one-way transmission from subscriber set UT to subscriber set UR; it will be understood, however, that similar equipment is to be provided for transmission in the reverse direction.

The equipment of station $ST_i$ consists essentially of a spread-spectrum modulator MSD working into a signal transmitter TR which is connected by a line $L_i$ to channel CT and which may operate, for example, by frequency modulation of a carrier. A signal receiver RR of station $SR_i$, complementing transmitter TR, recovers the baseband signal from the arriving carrier and feeds it to a spread-spectrum demodulator DSD. Modulator MSD comprises a differentiator DE connected to one input of a first multiplier M1 having another input connected to a pulse generator G1 which emits a random or pseudorandom binary pulse sequence alternating between a positive and a negative voltage of the same absolute magnitude. Such a pulse generator may include, for example, a shift register with a multimode feedback varying in a programmed manner. The readout rate could also be subject to a programmed variation as long as the basic pulse period is not greater than twice the reciprocal of the bandwidth of the outgoing signal, i.e. does not extend over more than a half-cycle of the highest voice frequency to be transmitted. Receiver RR is fed by a line $L'_i$.

Demodulator DSD comprises a second multiplier M2 having one input connected to receiver RR and another input connected to the output of a pulse generator G2 which is identical with pulse generator G1 and is synchronized therewith in a manner symbolized by a connection SY; such synchronization could be achieved, for instance, by a pilot frequency outside the voice band. Multiplier M2 works into an integration circuit IN synchronized with generators G1 and G2 so that its output voltage returns to zero at the end of each pulse period. Thus, circuit IN is of the integration-and-dump type as shown, for example, in commonly owned U.S. Pat. No. 4,201,909. This circuit feeds a signal restorer ER, more fully described hereinafter with reference to FIG. 2, from which a connection extends via a low-pass filter FPB to speaker UR.

As shown in FIG. 2, signal restorer ER comprises an adder SC having a main input connected to integration circuit IN and an ancillary input tied to its own output by a feedback loop including a delay line LR. The retardation T introduced by line LR equals a basic pulse period of generators G1, G2 and may be subject to adjustment if that pulse period is variable as noted above; in that instance the line DL may be coupled to generator G2 for automatic readjustment.

In FIG. 3 I have shown a subscriber set UT' which may be carried aboard a vehicle together with a transmitting station $ST'_i$ whose signal transmitter TR' has an antenna TA for sending out radio-frequency carriers frequency-modulated by the outgoing signals. A signal receiver RR' of an associated receiving station $SR'_i$, serving a subscriber set UR', has an antenna RA for intercepting a transmitted carrier to be frequency-demodulated if that carrier is intended for station $SR'_i$, as determined by conventional coding. (Here, again, equipment needed for signal transmission in the opposite direction has not been illustrated.) The carriers which can be sent out via antenna TA and received by antenna RA constitute a plurality of signal channels including several normal channels (carrying only one message each) and one spread-spectrum channel adapted to be used simultaneously by several subscribers, some of which could also be served by simpler stations such as those shown in FIG. 1. Station $ST'_i$ differs from station $ST_i$ by the provision of a channel tester CLT controlling a switching circuit OST which alternatively connects subscriber set UT' to transmitter TR' via a direct path P or via spread-spectrum modulator MSD. Similarly, switching circuit OSR controlled by a channel tester CLR in station $SR'_i$ alternatively connects receiver RR' to subscriber set UR' via a direct path P' or via spread-spectrum demodulator DSD. Thus, tester CLT determines whether transmitter TR' has access to an available normal channel, in which case the path P is used to modulate the voice signals from subscriber set UT' directly upon an outgoing carrier; if all normal channels are busy and the subscriber wishes to communicate with station $SR'_i$, e.g. because of an emergency situation, circuit OST in station $ST'_i$ switches the microphone UT' to modulator MSD whose output signal is then modulated by transmitter TR' upon a carrier reserved for spread-spectrum communication. Similarly, tester CLR in station $SR'_i$ identifies the channel on which incoming signals are received and causes these signals to be switched by circuit OSR to path P' for direct delivery to speaker UR' if a normal channel is being used; otherwise, the incoming baseband signal passes through demodulator DSD for restoration of the original analog signal.

I shall now describe, with reference to FIG. 4, the operation of modulator MSD and demodulator DSD in the system of FIG. 1 or FIG. 3.

Graph (a) of FIG. 4 shows an outgoing analog message signal $s_i(t)$, simply illustrated as a sine wave, emitted by the microphone UT (or UT') and differentiated in circuit DE; the resulting time derivative $s_i(t)$ of that signal is shown in graph (b). The pulse sequence $p_i(t)$ emitted by generator G1, shown in graph (c), has a basic pulse period T whose length is a fraction of a half-cycle of the wave $s_i(t)$ of graph (a) and preferably ranges between about one-third and one-fourth of a half-cycle of the shortest wave to be transmitted. The actual pulses of the sequence $p_i(t)$ extend each over one or more periods T and are either positive or negative, with a magnitude assigned the value $\pm 1$. When signals $s_i(t)$ and $p_i(t)$ are multiplied in device M1, a distorted signal x(t) as shown in graph (d) results. Depending on the nature of channel CT, the latter signal can be sent directly or by way of a carrier to demodulator DSD; such a carrier, of course, will always be required when that channel is a radio link as shown in FIG. 3. A signal y(t) appearing in the output of receiver RR (or RR') may differ from signal x(t) by accompanying interfering signals which have not been illustrated. These interferences are substantially suppressed by integrator IN whose output signal $s_d(t)$ consists of a succession of generally sawtooth-shaped samples of uniform width T, as shown in graph (e). Signal restorer ER combines these samples into a continuous wave $s_r(t)$, shown in graph (f), which has a low-frequency component corresponding, upon being extracted by filter FPB, to the original message signal $s_i(t)$.

Signal y(t) fed to multiplier M2 is given by the following equation:

$$y(t) = \dot{s}_i(t)p_i(t) + \sum_{j \neq i} a_j \dot{s}_j(t)p_j(t) \quad (1)$$

There, $a_j$ represents the amplitude and $\dot{s}_j(t)$ represents the shape of a signal, corresponding to time derivative $\dot{s}_i(t)$, concurrently sent over the common channel CT from any other transmitting station to a respective station; symbol $p_j(t)$ designates the associated pulse sequence. Another term of equation (1), omitted for the sake of simplicity, represents the contribution of thermal noise.

An integrated sample of signal $s_d(t)$ in the output of circuit IN, appearing during a pulse period nT, is designated $s_d(nT)$ and is given by:

$$s_d(nT) = \int_{(n-1)T}^{nT} \dot{s}_i(t)p_i^2(t)dt + \sum_{j \neq i} \int_{(n-1)T}^{nT} a_j \dot{s}_j(t)p_j(t)p_i(t)dt \quad (2)$$

The factor $p_i^2$ in the first integral will always have unity value while the integrals of the second term will average out to substantially zero. Thus, equation (2) can be rewritten in the form $$s_d(nt) \approx s_i(nT) - s_i[(n-1)T] \quad (3)$$

where $s_i(nT)$ is the amplitude of signal $s_i(t)$ during period nT whereas $s_i[(n-1)T]$ is that amplitude in the immediately preceding pulse period. If a sum sample represented by $s_r(t) = s_d(nT) + s_r[(n-1)T]$ in the output of adder SC (FIG. 2) is taken during a pulse period following one in which $s_d[(n-1)T] \approx s_i[(n-1)T] \approx 0$, subsequent sum samples $s_r$ emitted by restorer ER will rather faithfully conform to respective message samples $s_i$.

Structurally, the components lying between differentiator DE and signal restorer ER in the system of FIG. 1 correspond to those of conventional spread-spectrum systems.

The structure of FIG. 3 is identical with that disclosed in my copending application Ser. No. 215,793 of even date [attorney's docket No. 12257] relating to a somewhat different method of and device for the transmission of analog signals by the spread-spectrum technique.

I claim:

1. A method of sending signals from a plurality of transmitting stations to respective receiving stations over a common channel, comprising the steps of:
   (a) differentiating an outgoing analog signal at a given transmitting station to produce a time derivative thereof;
   (b) multiplying said time derivative at the given transmitting station with a sequence of bipolar binary pulses individual thereto and essentially uncorrelated with pulse sequences employed at other transmitting stations using said common channel, said individual sequence having a basic pulse period not exceeding the reciprocal of twice the bandwidth of said outgoing signal, to produce a distorted signal;
   (c) conveying said distorted signal via said common channel to the associated receiving station;
   (d) multiplying the incoming distorted signal at the associated receiving station with a synchronized replica of said individual sequence to re-establish the time derivative of step (b) possibly encumbered by interfering signals from other users of said common channel;
   (e) integrating the re-established time derivative over intervals equaling said basic pulse period to produce a succession of signal samples of uniform width;
   (f) combining said signal samples into a continuous wave substantially purged of interfering signals and with a low-frequency component conforming to said outgoing analog signal; and
   (g) isolating said low-frequency component.

2. A method as defined in claim 1 wherein said basic pulse period ranges between substantially one-third and one-fourth the reciprocal of said bandwidth.

3. A method as defined in claim 1 or 2 wherein step (f) comprises adding each new signal sample to a delayed sum sample obtained by the addition of an immediately preceding signal sample to a sum sample produced in like manner one basic pulse period earlier.

4. In a telecommunication system wherein a plurality of transmitting stations and a plurality of receiving stations are provided with a common channel for the conveyance of analog signals from a given transmitting station to an associated receiving station, each transmitting station comprising a first generator of an individual sequence of binary pulses essentially uncorrelated with pulse sequences emitted by corresponding generators at all other transmitting stations, each transmitting station further comprising first arithmetic means for multiplying an outgoing signal with said individual sequence, each receiving station comprising a second generator synchronized with said first generator of the associated transmitting station for emitting a replica of said individual sequence, each receiving station further comprising second arithmetic means for multiplying an incoming signal with said replica and circuitry including integrating means connected to said second arithmetic means for substantially reconstituting said outgoing signal, the improvement wherein at least one of said transmitting stations and an associated receiving station further comprise:

differentiation means upstream of said first arithmetic means for converting an outgoing analog signal into a time derivative thereof giving rise to a distorted signal in the output of said first arithmetic means, said distorted signal being reconverted by said second arithmetic means into the original time derivative possibly encumbered by interfering signals from other transmitting stations using said common channel, said interfering signals being substantially suppressed by said integrating means operating with integration periods equal to a basic pulse period of said individual sequence;

signal-restoring means in said circuitry connected to said integrating means for receiving therefrom integrated samples of the reconstituted original time derivative substantially purged of interfering signals and combining the integrated samples into a continuous wave with a low-frequency component conforming to said outgoing analog signal; and filter means connected to said signal-restoring means for extracting said low-frequency component from said continuous wave.

5. A system as defined in claim 4 wherein said signal-restoring means comprises summing means with one input connected to said integrating means and delay means inserted between another input and an output of said summing means for feeding back sum signals issuing therefrom with a retardation equal to said basic pulse period.

6. A system as defined in claim 4 or 5 wherein said one of said transmitting stations comprises a first terminal provided with frequency-modulating means for sending out signals over any one of several radio-frequency channels including a plurality of normal channels besides said common channel, first test means connected to said first terminal for ascertaining the availability of any normal channel, and first switchover means controlled by said first test means connecting a source of outgoing analog signals to said first terminal directly in the presence of a free normal channel for signal transmission thereover and via said differentiation means and said first arithmetic means in the absence of a free normal channel for signal transmission over said common channel; the receiving station associated with said one of said transmitting stations comprising a second terminal provided with frequency-demodulating means for obtaining incoming signals from any of said radio-frequency channels, second test means connected to said second terminal for identifying a channel over which incoming signals are being received, and second switchover means controlled by said second test means for connecting said second terminal to a load directly upon arrival of incoming signals over any normal channel and via said second arithmetic means, said circuitry and said filter means upon arrival thereof over said common channel.

7. A system as defined in claim 6 wherein said one of said transmitting stations is carried aboard a vehicle.

* * * * *